(12) United States Patent
Wagener et al.

(10) Patent No.: US 10,447,531 B2
(45) Date of Patent: Oct. 15, 2019

(54) METHOD FOR MANAGING AND CONFIGURING FIELD DEVICES OF AN AUTOMATION SYSTEM AND CONFIGURATION SYSTEM FOR THIS PURPOSE

(71) Applicant: ABB Schweiz AG, Baden (CH)

(72) Inventors: Dirk Wagener, Stadthagen (DE); Christoph Welte, Neu-Ulm (DE); Marcus Heege, Kaisersesch (DE); Wolfgang Mahnke, Hettenleidelheim (DE); Marko Schlueter, Espelkamp (DE)

(73) Assignee: ABB ACHWEIZ AG, Baden (CH)

( * ) Notice: Subject to any disclaimer, the term of this patent is extended or adjusted under 35 U.S.C. 154(b) by 236 days.

(21) Appl. No.: 15/278,090

(22) Filed: Sep. 28, 2016

(65) Prior Publication Data

US 2017/0093622 A1 Mar. 30, 2017

(30) Foreign Application Priority Data

Sep. 28, 2015 (DE) .......... 10 2015 116 417

(51) Int. Cl.
*G06F 15/177* (2006.01)
*H04L 12/24* (2006.01)

(52) U.S. Cl.
CPC .......... *H04L 41/0806* (2013.01); *H04L 41/12* (2013.01); *H04L 41/20* (2013.01)

(58) Field of Classification Search
CPC ...... H04L 41/0806; H04L 41/12; H04L 41/20
USPC ........................................... 709/220
See application file for complete search history.

(56) References Cited

U.S. PATENT DOCUMENTS

| | | | | |
|---|---|---|---|---|
| 2008/0059538 | A1* | 3/2008 | Engel | G06F 16/1787 |
| 2008/0114720 | A1* | 5/2008 | Smith | G06Q 10/107 |
| 2010/0318640 | A1* | 12/2010 | Mehta | H04L 63/0884 |
| | | | | 709/223 |
| 2011/0153786 | A1* | 6/2011 | Merkel | G05B 19/4186 |
| | | | | 709/220 |
| 2013/0006399 | A1* | 1/2013 | Tandon | G05B 19/0423 |
| | | | | 700/88 |
| 2014/0122855 | A1 | 5/2014 | Maneval | |

(Continued)

FOREIGN PATENT DOCUMENTS

| | | | | |
|---|---|---|---|---|
| DE | 102009027949 | A1 * | 1/2011 | .............. H04L 41/00 |
| DE | 102009027949 | A1 | 1/2011 | |
| DE | 102010038458 | A1 | 2/2012 | |

(Continued)

*Primary Examiner* — Atta Khan
(74) *Attorney, Agent, or Firm* — Leydig, Voit & Mayer, LTD.

(57) ABSTRACT

A method for managing and configuring field devices of an automation system having a central FDI server, the topology of the automation system and the configuration of each field device within this topology being stored on the FDI server; having a configuration tool connected to the central FDI server via a network connection; and having a software package suitable for managing and configuring, and relates to a configuration system for this purpose, involves, for the purpose of offline configuration, associating a local FDI server (22) with the configuration tool, on which server the topology of the automation system and storing the configuration of each field device within this topology at least in part.

6 Claims, 1 Drawing Sheet

(56) References Cited

U.S. PATENT DOCUMENTS

2016/0342671 A1* 11/2016 Leston .................. G06F 16/273

FOREIGN PATENT DOCUMENTS

DE 102011007384 A1 * 10/2012 ............. H04L 41/00
DE 102011007384 A1 10/2012

* cited by examiner

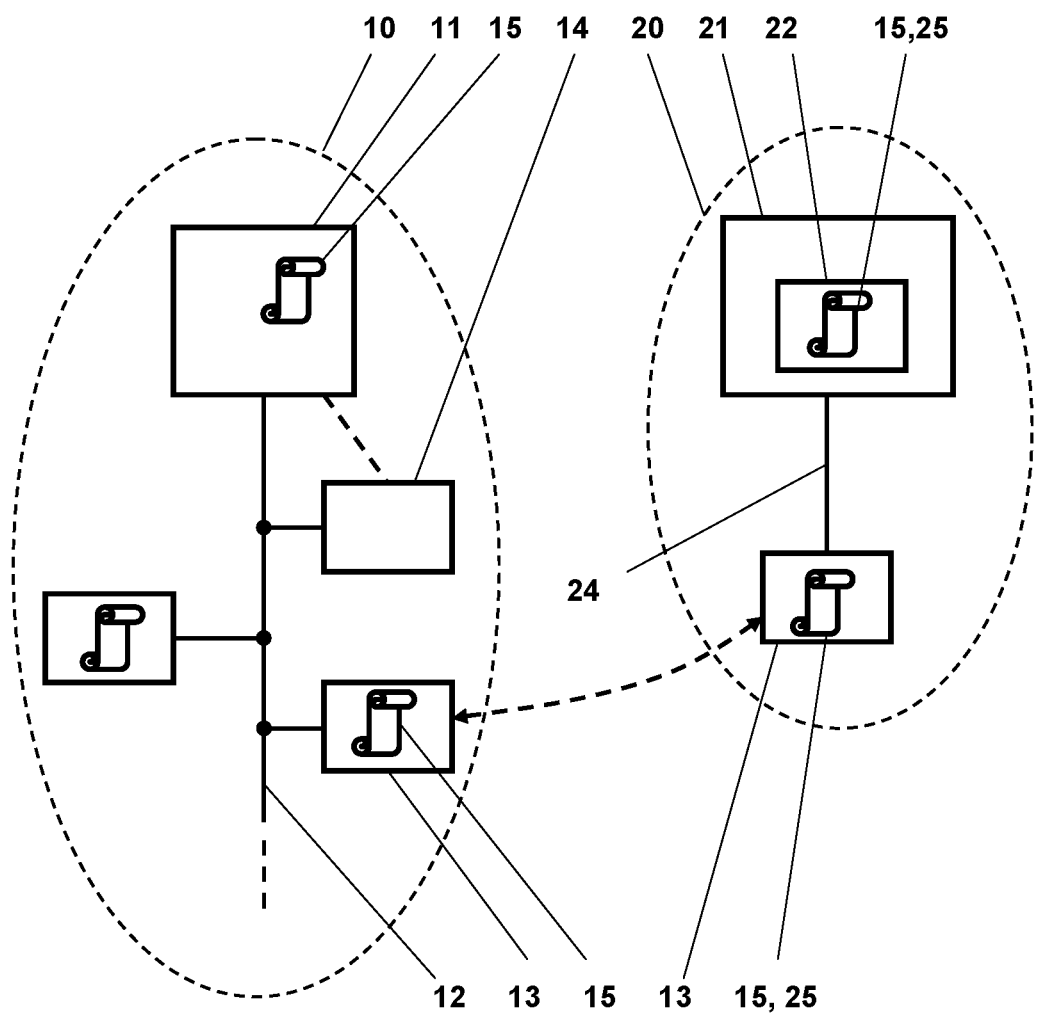

METHOD FOR MANAGING AND CONFIGURING FIELD DEVICES OF AN AUTOMATION SYSTEM AND CONFIGURATION SYSTEM FOR THIS PURPOSE

CROSS-REFERENCE TO RELATED APPLICATIONS

Priority is claimed to German Patent Application No. DE 10 2015 116 417.5, filed on Sep. 28, 2015, the entire disclosure of which is hereby incorporated by reference herein.

FIELD

The invention relates to a method for managing and configuring field devices of an automation system and to a configuration system for this purpose.

BACKGROUND

Automation systems for controlling a technical process or a technical system typically comprise a control apparatus (PLC) that is integrated in a group of a plurality of smart electrical devices. Smart electronic devices are those based on microprocessors, such as protective gear and control devices, motor protection devices, smart switches and voltage regulators, frequency converters, pressure and temperature transmitters, flowmeters and actuators.

It is known from the paper "FDI Device Integration—Best of Both Worlds", atp edition June 2010, pages 16 to 19, to integrate field devices in an automation system using an FDI concept (Field Device Integration IEC-62769). This concept is based on providing information on the configuration of field devices in a device-specific FDI package. This FDI package comprises a fixed amount of information, consisting of a device definition, business logic, user interface description and user interface plug-ins. The device definition includes management information and the device model. The business logic describes the communication logic in relation to the device and is used to ensure consistency in the device model. The user interface description describes the representation of the device parameters and device functions. The user interface plug-ins are programmed components of interface portions for displaying the device parameters and functions.

When configuring field devices using EDD (electronic device description) technology IEC 61804, a device manufacturer provides an EDD that contains information on the communication with the device and on the business logic and the user interfaces, i.e. which data entry masks should be displayed to a user. For example, the business logic includes which parameters may be written and when.

In addition to a single user element having various parameters, graphs and other elements, new windows and dialogs can also be defined in the EDD. In this case, a host has certain freedoms and can, for example, simultaneously display a plurality of menus defined in the EDD in various windows, as well as user interfaces of various device entities.

The FDI technology uses these mechanisms of the EDD and provides the concept of the FDI package, which, in addition to an EDD, can also contain other information such as the user manual and UIPs (user interface plugins), which provide additional user interfaces in other technologies, e.g. .NET assemblies, which, unlike EDD-based user interfaces, consist of programmed code compiled in relation to a component.

FDI packages are usually created by device manufacturers and used by system producers to integrate and configure the field devices of various device manufacturers in a production system.

The FDI technology is based on a client-server architecture in which the field devices are managed centrally by a server—the FDI server. Stored on this FDI server are the configuration of the automation system, specifically the topology thereof, and the configuration of each field device within this topology. The field devices of the automation system are FDI clients.

To actually configure the automation system, a configuration tool capable of managing the configuration of the FDI clients is provided. Any changes are first written to the FDI server and transmitted from the FDI server to the relevant field device. In the process, FDI technology necessarily provides an established communication connection between the FDI client and the FDI server, which connection is generally configured as a network connection in the automation system.

Unfortunately, FDI technology does not support the offline configuration of the automation system or parts thereof.

However, offline configuration becomes important whenever an existing communication connection between the configuration tool and the FDI server cannot be produced and/or maintained. Specifically, however, this does not definitively apply to all the settings in a field device that are first implemented either directly by the manufacturer or during the operating time for maintenance and/or repairs. In addition, every engineering operation carried out when the FDI server is not yet initialized is affected, especially project engineering.

SUMMARY

An aspect of the invention provides a method for managing and configuring field devices of an automation system including a central FDI server, a topology of the automation system and a configuration of each field device within this topology being stored on the central FDI server, and the automation system including a configuration tool connected to the central FDI server via a network connection, the method comprising, in order to manage and configure one or more field devices of the automation system when the network connection to the central FDI server is broken: loading and executing a local FDI server on the configuration tool; loading the configuration of at least one field device from the central FDI server onto the local FDI server; at least logically connecting the at least one field device to the local FDI server and configuring the at least one field device; and when the network connection of the at least one field device to the central FDI server is established, transferring a current configuration of the at least one field device into a data stock of the central FDI server in a rule-based manner.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 an automation system 10 with the components according to the invention.

DETAILED DESCRIPTION

Therefore, an object of the invention is to disclose a method and a configuration system for managing and configuring field devices of an automation system that can be implemented without an established communication connection to the FDI server.

According to an aspect, the invention relates to a method for managing and configuring field devices of an automation system and to a configuration system for this purpose, the method, and a device using it, being used in particular in process automation or machine control for controlling processes and/or system components.

An aspect of the invention is based on the management and configuration of field devices of an automation system comprising a central FDI server, the topology of the automation system and the configuration of each field device within this topology being stored on the FDI server, and comprising a configuration tool that is connected to the central FDI server via a network connection and is equipped with a software package that is capable of managing and configuring.

According to an aspect of the invention, in order to manage and configure field devices of an automation system when the network connection to the FDI server is broken, in a first step a local FDI server is loaded and executed on the configuration tool. In a second step, the configuration of at least one field device is loaded onto the local FDI server from the central FDI server. In a third step, the at least one field device is at least logically connected to the local FDI server and configured. Finally, when the network connection of said at least one field device to the central FDI server is established, the current configuration of said at least one field device is transferred into the data stock of the central FDI server in a rule-based manner.

According to another feature of the invention, the configuration of the at least one field device is transferred from the data stock of the local FDI server into the data stock of the central FDI server.

According to another feature of the invention, the configuration of the at least one field device is transferred from the configuration stored in the field device into the data stock of the central FDI server.

According to another feature of the invention, at least one part of the topology of the automation system is loaded from the central FDI server onto the local FDI server together with the configuration of the at least one field device.

According to another feature of the invention, the configuration of the at least one field device and/or of the at least one part of the topology of the automation system loaded on the local FDI server is locked on the central FDI server.

In terms of the device, the software package of the configuration tool for managing and configuring field devices of an automation system when there is no network connection to the central FDI server comprises a local FDI server on which the topology of the automation system and the configuration of each field device within said topology are stored at least in part. The software package of the configuration tool also includes client routines for providing locally altered configurations when the network connection to the central FDI server is re-established. The software package of the central FDI server comprises server routines for the rule-based transfer, from the local FDI server of the configuration tool, of locally altered configurations that have been provided.

The locally altered configurations are transferred according to predefined write lockouts on the central FDI server. Various scenarios can be configured in this respect.

Other properties and advantages as well as the mode of operation will be described in more detail on the basis of an embodiment. The single FIGURE shows an automation system 10 with the components that are essential to the description of the invention.

The automation system 10 comprises at least one central FDI server 11, in which the topology of the automation system 10 and configurations of all the field devices 13 (referred to hereinafter together as configuration 15) are stored. The field devices 13 are connected to the automation system 10 via a network connection 12. To manage and configure the field devices 13, the automation system 10 is equipped with a configuration tool 14. This configuration tool 14 can be connected to the central FDI server 11 directly or via the established network connection 12.

To configure the automation system 10 or a part thereof offline, during which the configuration tool 14 is disconnected from the central FDI server 11, i.e. there is neither a network connection 12 nor a direct connection to the central FDI server 11, an apparatus is provided, which will be referred to hereinafter as the client network 20.

The client network 20 comprises at least one configuration tool 21 having a software package capable of configuring the components of an automation system 10. This software package comprises a local FDI server 22.

To alter the configuration 15 of a field device 13 or the topology outside the automation system 10, the configuration 15 of the relevant part of the automation system 10 is transmitted from the central FDI server 11 to the local FDI server 22. The field device 13 is at least logically connected to the local FDI server 22 and configured.

According to a first embodiment, the configuration tool 21 only alters the data of the configuration 15 of a field device 13 or the topology of the automation system 10, without adjusting any physical structure. As a result, the local FDI server 22 contains a current configuration 25.

According to a second embodiment, the field device 13 is communicatively connected to the local FDI server 22 by the field device 13 being connected to the configuration tool 21 via a communication connection 24. In this embodiment, the current configuration 25 is written to the field device 13.

Regardless of these two designs, when the network connection 12 to the central FDI server 11 is established, the current configuration 25 of the field device 13 or the topology of the automation system 10 is transferred into the data stock of the central FDI server 11 in a rule-based manner.

In a first embodiment, the writing to the central FDI server 11 is restrictive. In this case, the field device 13 to be configured is locked exclusively on the central FDI server 11. In this state, the central FDI server 11 does not allow access to the field device 13, neither for reading nor for writing. In this disclosure, the access relates to the configuration of the field device 13 whilst the primary functionality of the field device 13, for example supplying measured values, remains unaffected. In this state, when the network connection 12 to the central FDI server 11 is broken, the relevant field device 11 can be configured on the local FDI server 22. When the configuration 15 of the field device 13 is altered and when there is an established network connection 12 to the central FDI server 11, the current configuration 25 of the field device 13 is transmitted from the local FDI server 22 to the central FDI server 11, and then the lockout of the field device 13 on the central FDI server 11 is cancelled.

If the topology of the automation system 10 is altered when there is an established network connection 12, the topology part to be processed is locked exclusively on the central FDI server 11. The possible alterations to the topology include, in particular, adding and deleting field devices 13 and shifting field devices 13 to another location in the topology. During this time, no other user can alter the topology in this region. In this state, the central FDI server 11 does not allow access to the selected part of the topology, neither for reading nor for writing. In this case, the field devices 13 can be locked in the selected part of the topology.

According to another feature of the invention, the field devices 13 have a clear ID independent of the topology. Advantageously, a field device 13 of this kind can be shifted within the topology to any location in the topology. A lockout on a field device 13 of this kind can be dispensed with when altering the topology of the automation system 10.

According to another feature of the invention, the lockout on a field device 13 and/or on a topology relates to the writing of configuration data. The configuration data of locked field devices 13 and/or topologies can be accessed to be read.

According to an alternative feature of the invention, access to the configuration of the field devices 13 and/or topologies is blocked when there is no network connection 12 to the central FDI server 11 (offline configuration), while the configuration of the field devices 13 and/or topologies can be accessed when there is an established network connection 12 to the central FDI server 11 (online configuration). Therefore, the field devices not required for offline configuration and clients thereof are still available for processing in the central FDI server.

In a second embodiment, the configuration of the field devices 13 and/or topologies is not locked. In this case, to configure at least one field device offline when there is no network connection 12 to the central FDI server 11, the configuration of said at least one field device 13 is loaded onto the local FDI server 22 from the central FDI 11 and the at least one field device 13 is physically connected to the local FDI server 2. The alterations to the configuration 25 of this at least one field device 13 are loaded into the at least one field device 13. When a network connection 12 is established between said at least one field device 13 and the central FDI server 11, the configuration 25, stored in the field device 13, of said at least one field device 13 is transferred into the data stock of the central FDI server 11. Advantageously, despite there being no complex locking mechanisms, the actual configurations of the field devices 13 connected to the central FDI server 11 via the network connection 12 always match the configurations of the field devices 13 managed on the central FDI server 11.

In a third embodiment, the topology is restrictively locked in accordance with the first embodiment and the configurations 15 of the field devices 13 remain unlocked in accordance with the second embodiment.

In a fourth embodiment, the configurations 15 of the field devices 13 are restrictively locked in accordance with the first embodiment and the topology remains unlocked in accordance with the second embodiment.

Regardless of the above-described embodiments of the invention, the configuration 15 of a field device 13 that is simultaneously connected to the central FDI server 11 and the local FDI server 22 of the configuration tool 14 when a network connection 12 is established, the configuration 25, stored in the field device 13, of said field device 13 is transferred to the data stock of the central FDI server 11. Advantageously, the actual configurations 25 of the field devices 13 connected to the central FDI server 11 via the network connection 12 always match the configurations 15 of the field devices 13 managed on the central FDI server 11.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE NUMERALS 10 automation system
11 central FDI server
12 network connection
13 field device
14 configuration tool
15 configuration
20 client network
21 configuration tool
22 local FDI server
24 communication connection
25 current configuration

The invention claimed is:

1. A method for managing and configuring field devices of an automation system including a central FDI server, a topology of the automation system and a configuration of each field device within this topology being stored on the central FDI server, and the automation system including a configuration tool connected to the central FDI server via a network connection, the method comprising, in order to manage and configure one or more field devices of the automation system when the network connection to the central FDI server is broken:

loading and executing a local FDI server on the configuration tool;
loading the configuration of at least one field device from the central FDI server onto the local FDI server;
at least logically connecting the at least one field device to the local FDI server and configuring the at least one field device;
when the network connection of the at least one field device to the central FDI server is established, transferring a current configuration of the at least one field device into a data stock of the central FDI server in a rule-based manner;
loading at least one part of the topology of the automation system from the central FDI server onto the local FDI server together with the configuration of at least one field device;
locking, on the central FDI server, the configuration of the at least one field device loaded on the local FDI server;
locking, on the central FDI server, the configuration of the at least one part of the topology of the automation system loaded on the local FDI server.

2. The method of claim 1, wherein the current configuration of the at least one field device is transferred from the data stock of the local FDI server into the data stock of the central FDI server.

3. The method of claim 1, wherein the current configuration of the at least one field device is transferred from the configuration stored in the field device into the data stock of the central FDI server.

4. A configuration system for managing and configuring one or more field devices of an automation system, the system comprising:
a central FDI server comprising a processor and a memory storing a software package executable by the processor; and
a configuration tool comprising a processor and a memory storing a software package executable by the processor, the configuration tool being connected to the central FDI server via a network connection, a topology of the automation system and a configuration of each field device within the topology being stored on the FDI server,
wherein the software package of the configuration tool, suitable for managing and configuring field devices of an automation system when there is no network connection to the central FDI server, includes a local FDI server on which the topology of the automation system and the configuration of each field device within the topology is stored at least in part,
wherein the software package of the configuration tool includes client routines for providing locally altered configurations when the network connection to the central FDI server is re-established, and
wherein the software package of the central FDI server includes server routines for the rule-based transfer, from the local FDI server of the configuration tool, of locally altered configurations that have been provided, and
wherein the software package of the central FDI server includes server routines for locking on the central FDI server the configuration of at least one of the field devices loaded on the local FDI server, and locking on the central FDI server the configuration of at least one part of the topology of the automation system loaded on the local FDI server.

5. The system of claim 4, further comprising:
a versioning system configured to manage the topology of the automation system and the configuration of each field device within the topology, provided depending on a storage site thereof on the central FDI server or the local FDI server.

6. The system of claim 4, wherein each field device includes a clear ID independent of the topology.

* * * * *

UNITED STATES PATENT AND TRADEMARK OFFICE
CERTIFICATE OF CORRECTION

PATENT NO. : 10,447,531 B2
APPLICATION NO. : 15/278090
DATED : October 15, 2019
INVENTOR(S) : Dirk Wagener et al.

It is certified that error appears in the above-identified patent and that said Letters Patent is hereby corrected as shown below:

On the Title Page

Item (73):
The name of the Assignee reads "ABB Achweiz AG" and should read --ABB Schweiz AG--

Signed and Sealed this
Twenty-fifth Day of August, 2020

Andrei Iancu
*Director of the United States Patent and Trademark Office*